March 24, 1964  B. L. ZEMAN  3,125,897
CONTROL DEVICE
Filed Dec. 28, 1961
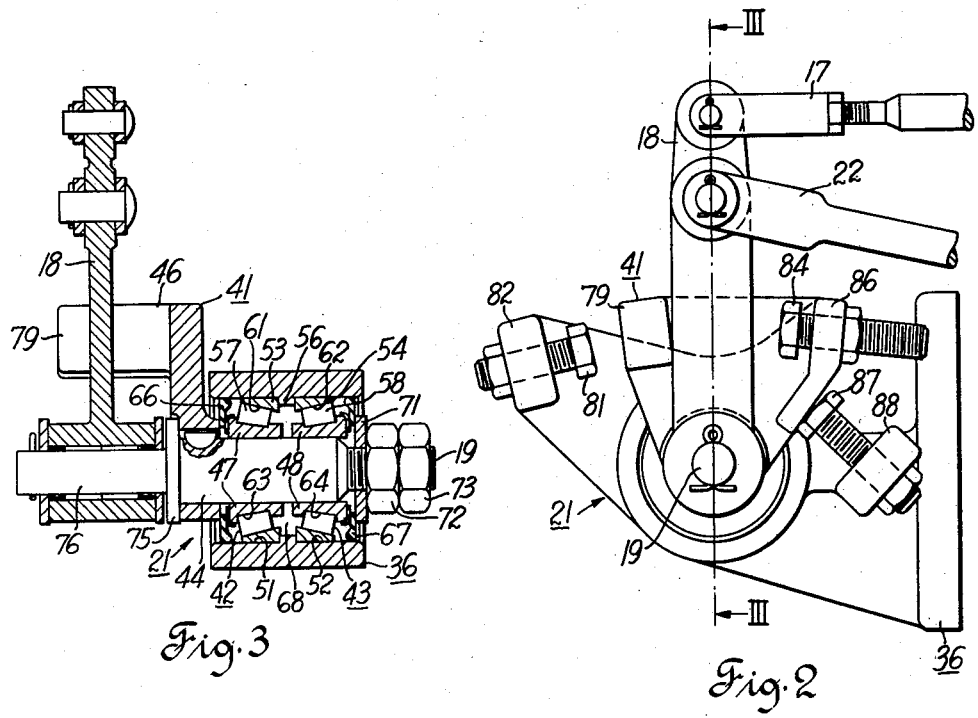
Fig. 3
Fig. 2
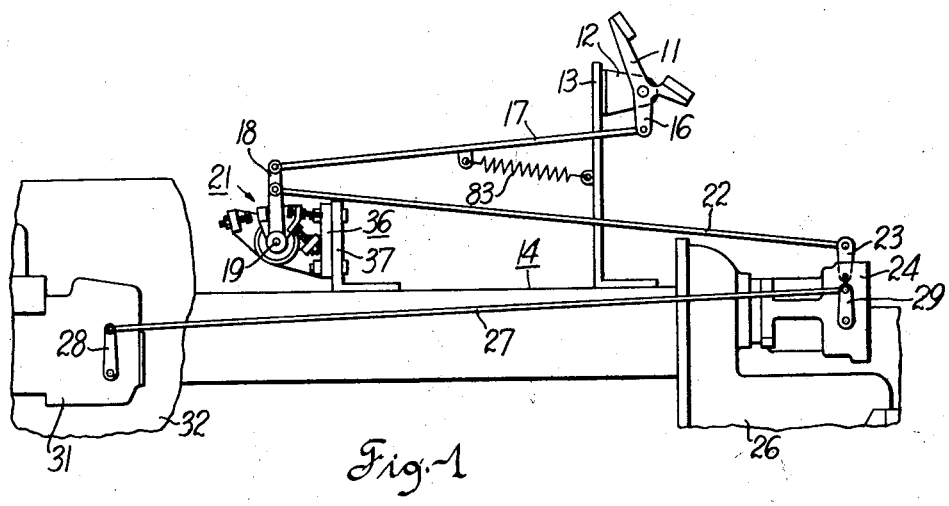
Fig. 1
Inventor
Bernard L. Zeman
By Charles L. Schwab
Attorney

3,125,897
CONTROL DEVICE
Bernard L. Zeman, Springfield, Ill., assignor to Allis-Chalmers Manufacturing Company, Milwaukee, Wis.
Filed Dec. 28, 1961, Ser. No. 162,731
6 Claims. (Cl. 74—531)

This invention relates to control mechanism and particularly to means for releasably maintaining a relatively adjustable member in its adjusted positions.

It is an object of this invention to provide an improved control means for releasably maintaining a rotatable control member in any one of its positions to which it is rotatably adjusted.

It is a further object of this invention to provide a rotary friction device for a manual control mechanism wherein the resistance to rotation is the same in either direction of rotation throughout its range of rotary movement.

It is a further object of this invention to provide a rotary friction device for a manually operated control mechanism which utilizes rolling resistance of antifriction bearings to maintain the control mechanism in the position to which it is manually adjusted.

It is a further object of this invention to provide a compact rotary friction device whose resistance to rotation is adjustable and which requires little, if any, servicing.

It is a further object of this invention to provide a speed control device which automatically resists rotary movement with equal resistance in either direction.

These and other objects and advantages of this invention will be apparent from the following description when read in conjunction with the accompanying drawings in which:

FIG. 1 is a schematic illustration showing an engine fuel control mechanism incorporating the control device of the present invention;

FIG. 2 is a side view of the control device of this invention; and

FIG. 3 is a section view taken along the line III—III of FIG. 2.

Referring to FIG. 1, an engine throttle control is illustrated. A foot operated accelerator-decelerator pedal 11 is rotatably supported by a bracket 12 secured to the frame 13 of a vehicle 14. An arm 16 of the pedal 11 is pivotally connected to one end of a link 17 which has its other end pivotally connected to the upper end of a control element in the form of a lever 18. Control lever 18 is pivotally connected at its lower end to a shaft 19 of a control device 21. A link 22 interconnects lever 18 and a control lever 23 of a ground driven governor 24 driven through gearing in the vehicle transmission 26 on which it is mounted. The transmission 26 in turn is mounted on the chassis 14 in a conventional manner. A link 27 interconnects a control lever 28 on a fuel injection pump governor 31, driven by and supported on an engine 32, and a control lever 29 of ground driven governor 24.

The control device 21 incorporating the present invention includes a support 36 which is rigidly secured to a frame member 37 of the chassis 14. Referring also to FIGS. 2 and 3, a control member 41 is rotatably mounted on the support member 36 by a pair of axially spaced antifriction bearings 42, 43. The control member 41 includes a shaft portion 44 and a lever portion 46 which are keyed to one another. The inner raceways 47, 48 are axially shiftably mounted on shaft portion 44 in axially spaced relation to one another. Although the assembly referred to as control member 41 is illustrated as having a shaft portion 44 and a lever portion 46, it is in effect a unitary structure since the two portions rotate in unison.

The shaft portion 44 is separable from the lever portion 46 for convenience of manufacture. The support member 36 has coaxial inward facing cylindrical surfaces 51, 52 supporting the outer raceways 53, 54 of the bearings 42, 43. A radially inward projecting annular flange 56 serves as an axial stop for the outer raceways and separates the bearings 42, 43 sufficiently to permit axial adjustment of the inner raceways toward one another. Antifriction bodies in the form of circumferentially spaced tapered rollers 57, 58 are in radial and axial load carrying contact with outer raceway surfaces 61, 62 formed on the stationary outer raceways 53, 54 and are in axial and radial load carrying contact with inner raceway surfaces 63, 64 on inner raceways 47, 48. Radial contact seals 66, 67 are carried by the control member 41 to prevent foreign material from entering the interior chamber 68 which is filled with lubricant.

The shaft portion 44 of control member 41 has a threaded end over which a washer 71 freely slides and on which jam nuts 72, 73 are screwed. Upon tightening nut 72 a determined amount, raceways 47, 48 are drawn toward one another to load the bearings 42, 43 sufficiently to increase the rolling resistance of the antifriction bodies to such an extent that the bearings 42, 43 act as friction means for resisting rotation of control member 41. Shaft flange 75 is in axial thrust transmitting relation to the hub of lever 46 which in turn is in axial thrust transmitting relation to raceway 47. The shaft 44, washer 71 and nut 72 serve as axial thrust transmitting means for adjusting the rolling resistance of the rollers 57, 58.

A reduced diameter portion 76 of shaft portion 44 rotatably supports control element 18. The element 18 has a lost motion connection with control member 41 permitting deceleration of the engine during changes of speed ranges of the transmissions 26 without changing the vehicle speed setting established by the rotated position of adjustment of control member 41. As illustrated, the foot pedal 11 is in a deceleration position. Further, clockwise rotation of the pedal 11 will reset the rotated position of control member 41 to a lower speed. If, for instance, lever 18 is moved counterclockwise until leg 79 of control member 41 is moved into abutment with set screw 81 in an ear 82 of the support 36, then the control member 41 will be in a low vehicle speed setting upon release of foot pedal 11, the latter action resulting in biasing spring 83 moving the lever 18 into abutment with set screw 84 in leg 86 of control member 41. The biasing spring is too weak to overcome the rolling resistance of the loaded bearings 42, 43. Set screw 87 in ear 88 on support 36 limits clockwise rotation of the frictionally held control member 41. As illustrated, the control member 41 is in its highest vehicle speed adjustment permitted by illustrated position of adjustment of set screw 87.

From the foregoing description, it is apparent that I have put antifriction bearings to a new and unobvious use. Instead of using bearings to permit relatively free rotation of parts, I load the bearings to such an extent that the rolling resistance of the rollers is increased sufficiently to create a friction device for a manual control mechanism. Since small, mass produced bearings are used, the control device of this invention is relatively inexpensive and compact. The bearings are not loaded to such an extent that the raceways and rollers become damaged and accordingly the friction device has long life. The seals 66, 67 keep the lubricant in and dirt out thus insuring long life and service free performance. The illustrated control device offers the same resistance to rotation throughout its range of pivotal movement.

Although a single embodiment of this invention has been illustrated and described, it is intended that this invention shall include all embodiments covered by the appended claims.

What is claimed is:
1. A control device comprising:
a manually operated rotary control member,
a support member,
means rotatably securing said control member to said support member for movement between a plurality of rotatively adjusted positions including
a pair of axial and radial load carrying and axially spaced antifriction bearings between said control member and support member having
a first pair of axially spaced raceway surfaces on one of said members in axially fixed relation to one another,
a raceway mounted on the other of said members in axially shiftable relation thereto,
a second pair of axially spaced raceway surfaces on said other member and raceway, respectively, and
antifriction bodies between and in axial and radial load carrying contact with said first and second pair of raceway surfaces
and axial thrust transmitting means between and in axial thrust transmitting relation to said other member and raceway forcing said other pair of raceway surfaces axially relative to one another to increase the rolling resistance of said bodies sufficiently to releasably maintain said control member in any of said positions to which it is adjusted.

2. The structure set forth in claim 1 wherein said bearings are tapered roller bearings.

3. The structure set forth in claim 1 wherein said control member includes a shaft portion presenting one of said second pair of raceway surfaces and said raceway is axially shiftably mounted on said shaft portion.

4. The structure set forth in claim 3 wherein said bearings are tapered roller bearings.

5. A control device comprising:
a manually operated pivotal control member,
a support member, and
means rotatably and frictionally securing said control member to said support member for movement between a plurality of rotatively adjusted positions including
a radial load carrying raceway surface on one of said members, a pair of axially spaced raceways axially adjustably mounted on the other of said members,
radial and axial load carrying raceway surfaces formed, respectively, on said raceways,
antifriction bodies in thrust transmitting relation to said surfaces, and
axial thrust transmitting means in axial thrust transmitting relation to said pair of raceways and forcing said pair of raceways axially relative to one another to increase the rolling resistance of said bodies sufficiently to releasably maintain said control member in any position to which it is adjusted.

6. The structure set forth in claim 5 wherein said raceways are mounted on said control member.

References Cited in the file of this patent
UNITED STATES PATENTS

| | | |
|---|---|---|
| 1,736,691 | Aplin | Nov. 19, 1929 |
| 2,184,855 | Stieber | Dec. 26, 1939 |
| 2,479,646 | Smith | Aug. 23, 1949 |
| 2,729,986 | Frobel | Jan. 10, 1956 |
| 2,822,702 | Scheppe | Feb. 11, 1958 |
| 2,986,430 | Bannerian | May 30, 1961 |